Patented Feb. 27, 1934

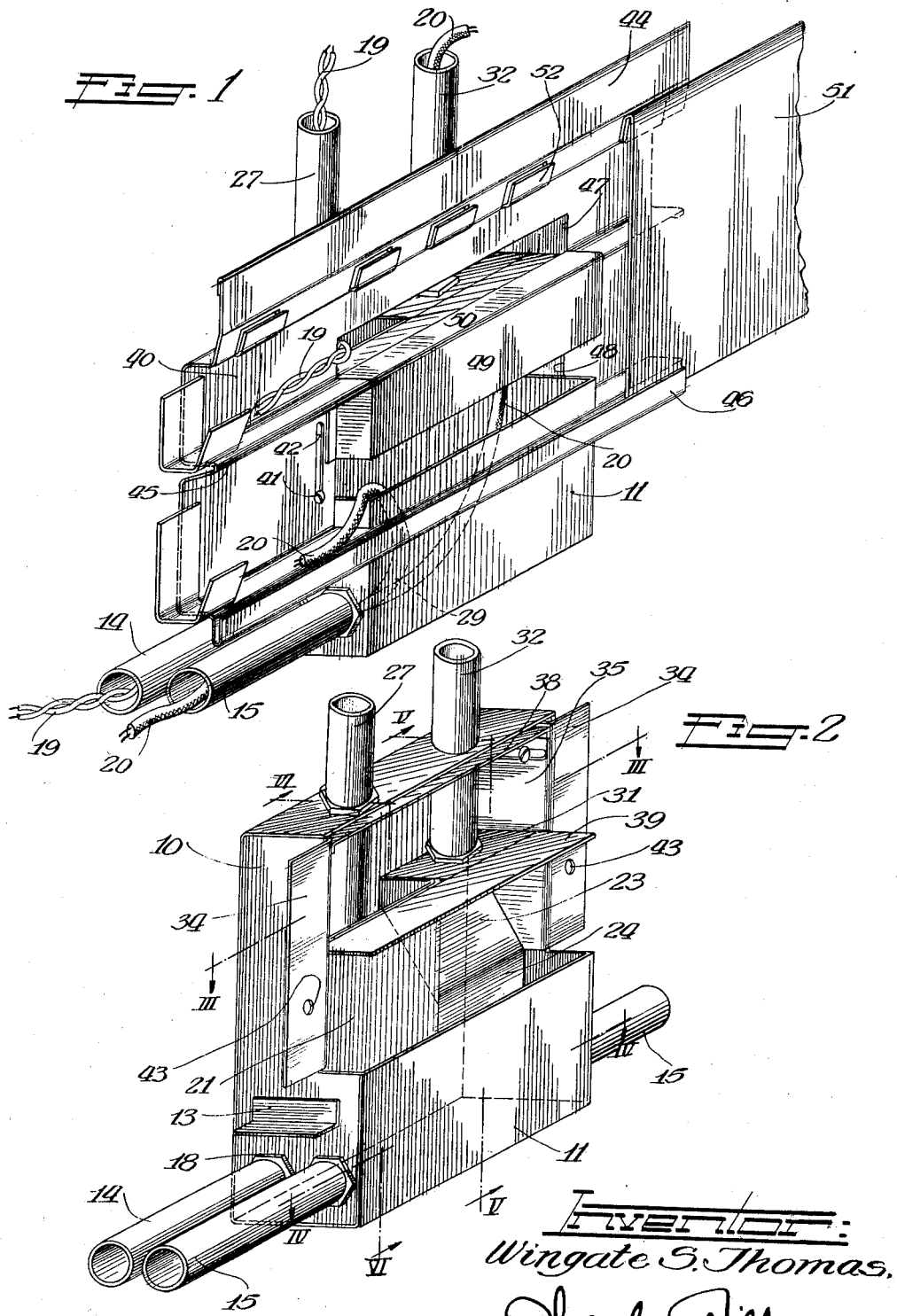

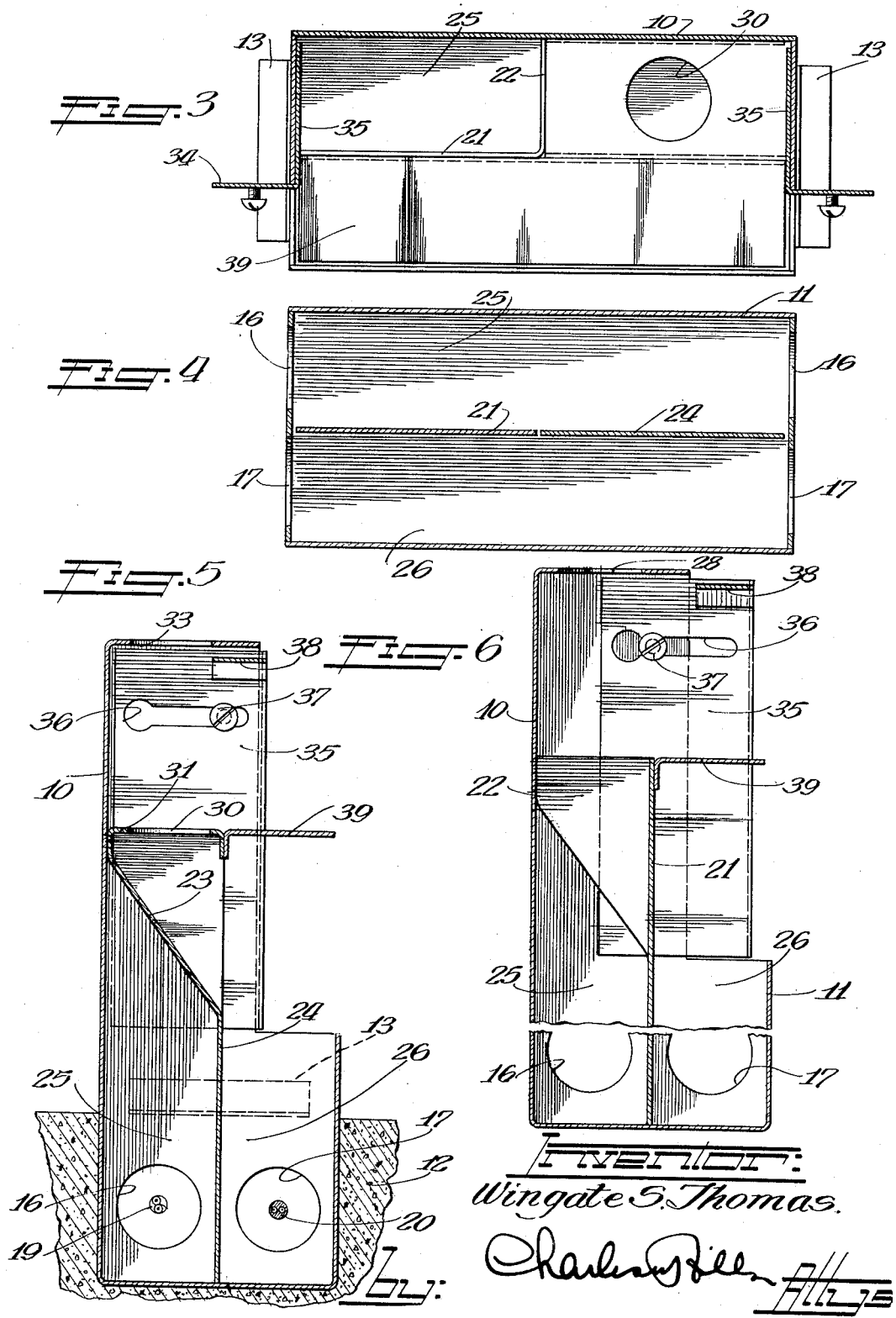

1,948,833

UNITED STATES PATENT OFFICE 1,948,833

JUNCTION BOX

Wingate S. Thomas, Chicago, Ill., assignor to Knapp Bros. Mfg. Co., Chicago, Ill., a corporation of Illinois Application May 4, 1929. Serial No. 360,569

3 Claims. (Cl. 247—15)

This invention relates to improvements in outlet or junction boxes of a type highly desirable for use in connection with flexible distribution systems for providing electric power or current to various localities within buildings and the like, although the invention may have many and various uses as will be apparent to one skilled in the art.

The present invention is somewhat of the nature and will perform the functions of the invention disclosed and described in my copending application for Letters Patent entitled "Junction box", filed May 4, 1929, Serial No. 360,570, and issued May 2, 1933, as Patent No. 1,906,670, the present invention being the more desirable of the two for installation during or simultaneously with the construction of new floors, walls, and the like.

One highly desirable flexible distribution system for the supply of electric power, finds embodiment in the use of a baseboard construction, wherein the base itself is formed so as to define a plurality of separate conduit-like passageways for conductors. Obviously, with such a system, some form of electrical conduit is utilized in or under a floor to establish connections for the major junction points of the system. Outlet or junction boxes of the type heretofore known were insufficiently universal in nature for desirable incorporation in such a flexible system, in view of the fact that such a system contemplates the use of high and low tension conductors which must be kept separate from each other, and which are not provided with any but their own individual insulation, i. e. installed in the same condition as they are commonly purchased upon the open market. These heretofore known outlet or junction boxes were objectionable in that they necessitated the employment of additional insulation, required special construction work in the vicinity of each box before the same could properly be installed, and were not sufficiently flexible to meet the requirements due to structural irregularities at particular places of installation. One of the major objections to these formerly known boxes is that they did not of themselves provide insulated passages for separate conductors with the passages opening in a sufficient number of directions. Consequently, other installations would of necessity be employed, with the resultant objectionable expenditure of time and labor together with the increased cost, and also together with the undesirable difficulty intailed in making proper splices within the box for branch circuits.

With these and other defects and objections in mind, it is an object of the present invention to provide a junction box which is interiorly divided into a plurality of separate passageways opening on at least three sides of the box, and wherein conductors may be readily and freely inserted, passed, or spliced without the use of additional insulation.

The invention also seeks the provision of a junction box having a portion which may be imbedded in a floor or the like and in effect form a part of an under floor conduit system.

Another object of the present invention is to provide a junction box highly desirable for use in connection with a double raceway base, which box not only communicates with under floor conduits, but also permits splices to be readily made therein and circuits to be branched therefrom in a plurality of directions, each individual variety of conductors being kept separate and apart from all other conductors.

Another object of the present invention is to provide an outlet or junction box for a flexible distribution system, which box is readily and easily located in proper position relative to a floor, and also is adjustable to compensate for irregularities in construction at the particular place of installation.

It is a further object of the present invention to provide a device of the character described herein which permits conductors to enter and leave the device through the sides, front, and top thereof, each conductor being definitely separated from any other conductor.

A still further object of the present invention is to provide a box of the character described herein which may be installed so as to connect both with an under floor conduit system and a passaged base system simultaneously with the installation of the aforesaid systems or at a subsequent time.

While some of the more salient features, characteristics, and advantages of a device embodying this invention have been above pointed out, others will become apparent from the following disclosures.

The invention includes these and other features of construction and combinations of parts hereinafter described, and shown in a preferred form in the drawings, as more particularly indicated by the claims.

On the drawings:

Figure 1 is a fragmentary perspective view of a device embodying principles of the present invention, shown as equipped with a cover plate and in position for use.

Figure 2 is a view similar to Figure 1 of the device itself.

Figure 3 is an enlarged plan sectional view of the device itself taken substantially as indicated by the line III—III of Figure 2.

Figure 4 is a view similar to Figure 3 taken substantially as indicated by the line IV—IV of Figure 2.

Figure 5 is an enlarged vertical sectional view taken substantially as indicated by the line V—V of Figure 2, but showing the device as imbedded in a floor.

Figure 6 is a fragmentary view similar to Figure 5, and taken substantially as indicated by the line VI—VI of Figure 2.

As shown on the drawings:

In the structure selected to illustrate an embodiment of the present invention, there is shown a box-like structure 10, having a lower portion 11 for imbedment in a floor 12 (Figure 5) or the like. On each side wall of the box 10 a floor line flange 13 is provided which fixes the box at the right height so that conduits 14 and 15 which normally lie in or under the floor 12, will properly meet openings 16 and 17 respectively in each side wall of the lower portion 11 of the box 10. The conduits are connected to the box walls by lock nuts 18, or in any equivalent manner, the box portion 11 functioning as a part of each conduit line.

The conduits 14 and 15 preferably contain low tension conductors 19 and high tension conductors 20 respectively, the low tension conductors being of the type commonly used for telephones, bells, buzzers, and the like, and the high tension conductors being in most instances for lighting circuits. Obviously, these low and high tension conductors must be strung through separate conduits or passageways, and to this end a central vertical partition 21 is provided in the box 10. This partition 21 has an angularly and rearwardly turned portion 22 having a lower oblique edge which coincides with an upper oblique portion 23 of central vertical partition 24 similar to the partition 21. The two partitions 21 and 24, each of which extends substantially half way through the box 10 longitudinally thereof, effectively divide the lower portion 11 interiorly into two conduit-like passageways 25 and 26 for the low and high tension conductors 19 and 20 respectively, whereby there is no necessity of the conduits 14 and 15 passing through the lower portion 11 of the box, and the conductors 19 and 20 are readily accessible for the making of proper connections to establish branch circuits.

With reference to Figures 1 and 2, it will be seen that the partition 21 together with its inturned portion 22 effectively defines a vertical passageway leading upwardly from the horizontal passageway 25, whereby the low tension conductor 19 may easily be provided with a branch conductor extending upwardly to a conduit 27 which communicates with the box-like structure 10 through a suitable aperture 28 (Figure 6) in the top thereof. Similarly by making a suitable splice at 29 (Figure 1) a branch line from the conductor 20 may be brought up along the partition 24, over the oblique portion 23, through a suitable aperture 30 in a horizontal portion 31 preferably integral with the oblique portion 23 (Figure 5) and out of the structure 10 through a conduit 32 which extends through a suitable aperture 33 in the top of the box and has its lower end secured to the horizontal portion 31. So far, therefore, it is apparent that conductors may be passed horizontally through the box 10, and also vertically through the box 10, each conductor being in an individual passageway insulated from any other passageway.

To compensate for irregularities in construction of any particular location where a box 10 is to be installed, the box is provided at each side thereof with a laterally extending wing 34 having an inwardly extending portion 35 in juxtaposed relationship with the corresponding side wall of the box. The inwardly extending portion 35 of each of the wings is provided with a relatively long slot 36 through which a stud 37 extends, the stud being secured to the adjacent box wall, whereby the wing may slide laterally upon the stud.

Extending substantially parallel to the top of the box 10 is a yoke 38 which connects the wings 34 to which the yoke is secured in any suitable manner such, for example, as spot welding. This yoke not only provides a more rigid structure, but also acts substantially as a continuation of the top of the box when the wings are moved outwardly.

It will be noted that the upper portion of the box 10 is sunk inwardly from the lower portion 11, and substantially midway of this upper portion, a shelf 39 secured in any desirable manner to the partitions 21 and 23 extends outwardly so as to terminate substantally over the upper rim of the lower portion 11. This shelf 39 in effect establishes a pair of front entrances for the box, the lower entrance communicating with the conductor 20 in the passage 26, and the upper entrance communicating with the vertical passage behind the partition 21 and thus with the conductor 19 in the lower passage 25.

When the box 10 is used in connection with a distribution system incorporating a base having separate conduit-like passageways therein, a cover 40 is preferably adjustably mounted on the wings 34 of the box by means of a stud bolt 41 which passes through an elongated slot 42 in the cover and enters a suitable aperture 43 in each of the wings 34. With this structure, the cover 40 may be adjusted vertically with respect to the wings 34, and the wings 34 as hereinabove explained may be adjusted laterally with respect to the box 10, so that adequate compensation may be readily made for irregularities in construction adjacent the place of installation of the box. The cover, which has a similar configuration to the dual passaged base with which it is used, is more fully disclosed and described in my copending application for Letters Patent entitled "Junction box cover", filed May 4, 1929, Serial No. 360,568. This cover includes an upwardly extending flange 44 for engaging the front surface of a wall or the like, a central outwardly extending bead 45, and a lower downwardly extending flange 46 which preferably rests upon the floor line, the portions of the cover between the bead 45 and the upper and lower flanges being inwardly depressed to provide a pair of conduit-like passageways. The front of the cover is apertured as at 47 to provide an entrance to the upper part of the box 10, and an aperture 48 communicates with the lower portion of the box below the shelf 39 and above the edge of the portion 11. To keep the entrance openings through the cover distinctly separated, an apron 49 depending from a lateral portion 50 which rests upon the shelf 39 of the box 10, is provided and permits the cover to be adjusted vertically relatively to the wings 34. With this structure, a branch of the conductor 19 may be carried through the upper opening 47 in the cover and strung along the upper or low tension conductor passage in the cover and base, and likewise a high tension branch of the conductor 20 may be brought out of the lower opening 48 in the cover and strung along the lower or high tension passage. After the cover is in position and the necessary adjustments or connections made, the cover may be closed by a front plate 51 having an inwardly turned upper edge which engages behind lugs or brackets 52 on the cover, the bottom edge of the front plate 51 resting in a groove in the flange 46.

Obviously, the outlet or junction box hereinabove described may be installed simultaneously with the making of a floor, and a wall, or subsequent to the making thereof, it being only necessary to chisel out a portion of the floor to properly seat the lower portion of the box therein. Of course, it is to be understood that the conduit apertures in the box walls are preferably plugged in any desirable manner when not in use.

From the foregoing, it will be apparent that I have provided an outlet or junction box having provision for conductors to enter and leave the box through at least three walls thereof, the conductors passing substantially horizontally, or vertically through the box, or passing out through the front of the box, each conductor being in an individually insulated passageway separate and apart from any other conductor. It will be noted further that the box lends itself to ready and easy installation in a flexible distribution system simultaneously with the establishment of the system or subsequently thereto, and in addition provides ready access to any and all conductors contained in the box. Moreover, the box is simple in its construction and use, very durable, and may be economically manufactured.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a device of the character described, a box-like structure for disposition in a wall, the lower portion of said structure extending outwardly beyond the upper portion, a partition dividing said lower portion interiorly into separate compartments, each compartment being for the accommodation of a different conductor, said structure having a separate passageway leading from each of said lower compartments upwardly through the top of the box-like structure.

2. As an article of manufacture, a junction box having an opening in one side, a partition projecting into said opening for dividing said box into upper and lower portions, said partition having a cut-out portion, and a second partition extending between said first partition and the bottom of said box for dividing said lower portion into a front and rear compartment, said cut-out portion providing communication between said upper portion and the rear compartment, and said opening providing communication from the exterior of said box to said upper portion and to said front compartment and a separate passageway leading from said lower front compartment upwardly through the top of the box.

3. A junction box having an open front side, a partition projecting into said opening for dividing said box into upper and lower portions, a second partition extending between said first partition and the bottom of said box for dividing said lower portion into front and rear compartments, a third partition dividing said rear compartment into right and left sections, a cut out in the first said partition affording communication between said upper portion and said left rear section, and a cut out in the second said partition affording communication between said front compartment and said right section, a conduit secured to the top of said box for communication with said upper portion and said left rear compartment and a second conduit passing thru the top portion of said box and secured to said first said partition for communication with said right section and said front compartment.

WINGATE S. THOMAS.